United States Patent
Emch et al.

(10) Patent No.: US 7,387,819 B2
(45) Date of Patent: Jun. 17, 2008

(54) METHOD AND APPARATUS FOR REPAIRING BED-LINER COATINGS

(75) Inventors: Donaldson J. Emch, Goodrich, MI (US); Dan M. Bratys, Sr., Willoughby, OH (US); David R. Juzyk, Shelby Township, Macomb County, MI (US); Jose Trindade, Westlake, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 11/311,079

(22) Filed: Dec. 19, 2005

(65) Prior Publication Data

US 2006/0158001 A1 Jul. 20, 2006

(51) Int. Cl.
*B05D 3/00* (2006.01)
(52) U.S. Cl. .................. 427/294; 427/140; 427/355
(58) Field of Classification Search .................. None
See application file for complete search history.

(56) References Cited

U.S. PATENT DOCUMENTS

| | | | | |
|---|---|---|---|---|
| 5,162,388 | A | 11/1992 | Primeaux, II | 521/159 |
| 5,399,373 | A * | 3/1995 | Mrozinski | 427/140 |
| 5,442,034 | A | 8/1995 | Primeaux, II | 528/60 |
| 5,580,945 | A | 12/1996 | Wade et al. | 528/49 |
| 5,616,677 | A | 4/1997 | Primeaux, II et al. | 528/66 |
| 5,648,031 | A | 7/1997 | Sturtevant et al. | 264/80 |
| 5,814,398 | A | 9/1998 | Kronz et al. | 428/338 |
| 6,013,755 | A | 1/2000 | Primeaux, II et al. | 528/68 |
| 6,403,752 | B1 | 6/2002 | House et al. | 528/64 |
| 6,403,755 | B1 | 6/2002 | Stewart et al. | 528/287 |
| 6,613,389 | B2 | 9/2003 | Li et al. | 427/388.1 |
| 6,649,146 | B2 | 11/2003 | Angeletakis et al. | 424/49 |
| 6,762,242 | B1 | 7/2004 | Torto et al. | 524/588 |
| 6,775,955 | B1 | 8/2004 | Smith et al. | 53/141 |
| 7,001,948 | B2 * | 2/2006 | Gupta et al. | 524/871 |
| 2001/0046588 | A1 | 11/2001 | Sturtevant et al. | 428/141 |
| 2003/0047836 | A1 | 3/2003 | Rickner et al. | 264/235 |
| 2003/0105220 | A1 | 6/2003 | Gupta et al. | 524/589 |
| 2003/0118739 | A1 | 6/2003 | Li et al. | 427/421 |
| 2004/0105154 | A1 | 6/2004 | Luong et al. | 359/529 |

FOREIGN PATENT DOCUMENTS

| | | |
|---|---|---|
| EP | 0 287 192 A2 | 2/1988 |
| EP | 0 518 463 A2 | 4/1992 |
| EP | 0 517 466 A2 | 6/1992 |
| JP | 02188234 | 7/1990 |
| JP | 05245935 | 9/1993 |
| JP | 08001052 | 1/1996 |
| JP | 08336897 | 12/1996 |
| JP | 9-325290 | 5/1999 |
| WO | WO 98/56842 | 12/1998 |
| WO | WO 02/24780 A2 | 3/2002 |
| WO | WO 02/28935 A1 | 4/2002 |
| WO | WO 02/102869 A1 | 12/2002 |

OTHER PUBLICATIONS

Technical Data Sheet for CCP DS-51 Armorcote 951 Series Gel Coat, Nov. 2003.*
Symposium sponsored by the University of Southern Mississippi, Department of Polymer Science and Southern Society for Coatings Technology, Presented at the 21st Higher Solids and Waterborne Coatings Symposium, Feb. 1994, pp. 398-419, S. Luthra et al., "Applications of Polyaspartic Esters in Polyurea Coatings".
Symposium sponsored by the University of Southern Mississippi, Department of Polymer Science and Southern Society for Coatings Technology, Presented at the Water-Borne & Higher-Solids and Powder Coatings Symposium Feb. 24-26, 1993, pp. 49-56, D.A. Wicks et al., "Control of the Reaction Between Polyaspartic Esters and Aliphatic Polyisocyanates".
Elastomer Specialties, Inc. Polymers Division, Material Safety Data Sheet, Feb. 2003, GatorHyde HP Component A, 5 pages.
Elastomer Specialties, Inc. Polymers Division, Material Safety Data Sheet, Feb. 2003, GatorHyde HP Component B, 4 pages.
Presentation at the Polyurea Development Association Annual Conference, Aug. 19-21, 2003, M.L. Posey et al., 11 pages, "New Secondary Amine Chain Extenders for Aliphatic Polyurea Materials".
Coatings, Adhesives, Sealants and Elastomers Session, Paper 8, 9 pages, (date unavailable), A. Perex, Jr., et al., "Secondary Aliphatic Diamine Chain Extenders in Aliphatic Polyurea Spray Applications".
Reprint from 60 years of Polyurethanes: International Symposium and Exhibition, Jan. 1998, Huntsman Corporation, D.J. Primeaux II, "Polyurea Spray Technology in Commercial Applications".
Journal of Elastomers and Plastics, vol. 24, Oct. 1992, pp. 323-336, D.J. Primeaux II, "100% Solids Aliphatic Spray Polyurea Elastomer Systems".
34th Annual Polyurethane Technical/Marketing Conference, Oct. 21-24, 1992, pp. 598-604, D.J. Primeaux II et al., "The Processing of Spray Polyurea Elastomer Systems".
32nd Annual Polyurethane Technical/Marketing Conference, Oct. 1-4, 1989, pp. 126-130, D.J. Primeaux, II, "Spray Polyurea Versatile High Performance Elastomer for the Polyurethane Industry".
35th Annual Polyurethane Technical/Marketing Conference, Oct. 9-12, 1994, pp. 74-87, D.W. House et al., "The Use of a New Class of Light-Stable Aliphatic Diamines in Polyurea and Polyurethane Coatings".

* cited by examiner

*Primary Examiner*—William P Fletcher, III
(74) *Attorney, Agent, or Firm*—Robert A. Diaz; Deborah M. Altman

(57) ABSTRACT

A method of repairing a vehicle bed-liner includes depositing a two-component patching material into the defect and placing a template having a design surface over the defect in the bed-liner, with the design surface facing the defect. A rigid backing plate can be placed over the template. The template is biased toward the patching material to form a patch in the bed-liner.

15 Claims, 2 Drawing Sheets

METHOD AND APPARATUS FOR REPAIRING BED-LINER COATINGS

CROSS REFERENCE TO RELATED APPLICATIONS

This application is related to U.S. Provisional Patent Applications Ser. Nos. 60/606,662; 60/606,670; 60/606,638; 60/606,672; 60/606,661; and 60/606,639, all filed on Sep. 2, 2004, and all of which applications are herein incorporated by reference in their entirety.

BACKGROUND OF THE INVENTION

1. Field of the Invention

This invention relates generally to the repair of protective coatings and, in one particular embodiment, to the repair of vehicle bed-liner coatings.

2. Technical Considerations

Protective coatings are known for protecting various substrates, such as metal or plastic pipelines, large gravel haulers, vehicle components, railroad cars, metal valves, plastic parts, etc., from mechanical and/or environmental damage. One particular use for such protective coatings is in so called vehicle "bed-liners". Bed-liners are provided in the cargo bed areas of trucks or other commercial vehicles to protect the underlying metal bed from scratches, dents, chips, corrosion, and other damage. Additionally, the bed-liner provides the vehicle with a desirable aesthetic appearance, especially when the bed-liner is new. Conventional bed-liners can be formed by attaching prefabricated rubber or plastic pieces onto the vehicle bed. Alternatively, the bed-liner can be formed in situ by the spray application of a liquid coating composition onto the vehicle bed, which coating composition then cures to form the protective bed-liner.

While generally acceptable for their intended purpose, problems can develop with the use of such conventional bed-liners. For example, when new, the bed-liner initially protects the underlying metal surface from mechanical damage caused by hauling or throwing objects into the vehicle bed and/or environmental damage, such as corrosion, that can be caused by moisture. However, with continued use, the bed-liner can become scratched, gouged, or otherwise damaged. This can lead to a decrease in the aesthetic appearance of the bed-liner or, more importantly, can expose portions of the underlying metal vehicle surface, which can promote scratching of the metal surface or corrosion. Once rust or other corrosion gains a foothold, degradation of the entire metal bed can follow. Additionally, for spray-applied bed-liners, bubbles or voids or other application defects can exist in the bed-liner coating.

Once a vehicle bed-liner has become damaged or application defects are detected, the entire bed-liner may have to be removed and an entirely new bed-liner applied to the vehicle bed to prevent continued corrosion of the underlying metal surface. This can be a time-consuming and expensive venture. Alternatively, a vehicle owner may try to patch the damaged area using duct tape or other conventional patching compositions. However, a drawback of this procedure is that the patched area may not match the original bed-liner appearance, e.g., color, texture, and/or design, which can lead to a "patchwork quilt" appearance of the overall bed-liner. This is aesthetically undesirable. Moreover, the patching material can have a different mechanical and/or chemical durability than the original bed-liner, which can result in the need to continually re-patch the area as the patching material wears away.

Therefore, it would be desirable to provide a method and/or apparatus for repairing a damaged bed-liner that eliminates or reduces at least some of the problems described above.

SUMMARY OF THE INVENTION

A method of repairing a protective coating, such as a vehicle bed-liner, comprises depositing a two-component patching material into a coating defect and contacting the patching material with a template having a design surface such that the design on the design surface is transferred to the patching material.

Another method of repairing a vehicle bed-liner comprises depositing a two-component patching material into a coating defect, placing a template having a design surface over the patching material with the design surface facing the patching material, and biasing the template toward the patching material such that the design on the design surface is transferred to the patching material. In one embodiment, the template can be biased toward the patching material by a magnet.

Another method of repairing a vehicle bed-liner comprises providing a template having a design surface and placing the template over a defect in the bed-liner, with the design surface facing the defect. A rigid backing plate can be placed over the template. A support can be formed on the bed-liner around the defect and a vacuum sheet can be placed over the backing plate, with the vacuum sheet extending at least to the support. At least a partial vacuum can be formed in a chamber formed by the bed-liner, support, and vacuum sheet. A two-component patching material can be injected through the vacuum sheet, backing plate, and template into the defect to form a polyurea patch in the defect. The template can also be held against the patching material by a small weight on horizontal or substantially horizontal surfaces.

A vehicle bed-liner repair kit comprises one or more of: a template having a design surface or means for making a template having a design surface, a backing plate, patching material, and at least one magnet.

Another vehicle bed-liner repair kit comprises at least one of a template having a design surface, patching material, a rigid backing plate, a vacuum sheet, and a support.

A repaired bed-liner comprises a substrate, a bed-liner formed over at least a portion of the substrate, and a patch formed in at least a portion of the bed-liner to repair a defect in the bed-liner.

DETAILED DESCRIPTION OF THE INVENTION

Figure 1:
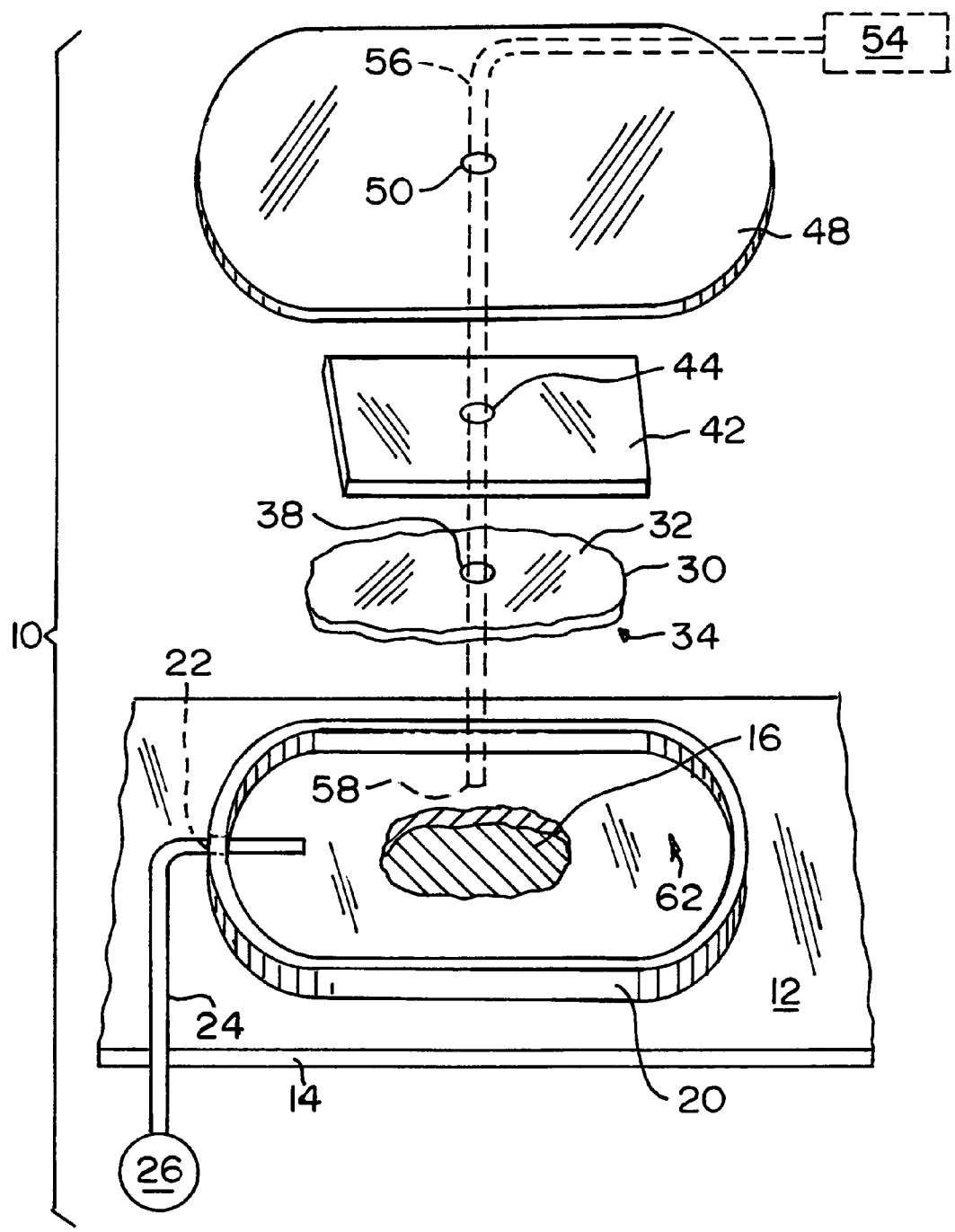
FIG. 1 is an expanded view (not to scale) illustrating an exemplary repair assembly and method for repairing a damaged bed-liner.

As used herein, spatial or directional terms, such as "up", "down", "above", "below", "top", "bottom", and the like, relate to the invention as it is shown in the drawing figures. However, it is to be understood that the invention can assume various alternative orientations and, accordingly, such terms are not to be considered as limiting. Further, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 6.1, 3.5 to 7.8, 5.5 to 10, etc. All references referred to herein, such as but not limited to issued patents and published applications, are to be understood to be incorporated by reference in their entirety. As used herein, the term "polymer" includes homopolymers and copolymers, and oligomers.

The general concepts of the invention will now be described with particular reference to use in repairing a damaged vehicle bed-liner. However, it is to be understood that the invention is not limited to use with repairing vehicle bed-liners but could be practiced in a variety of fields, such as but not limited to the repair of protective coatings on boat hulls, trailers, pipelines, valves, plastic components, or rail cars, just to name a few.

Figure 2:
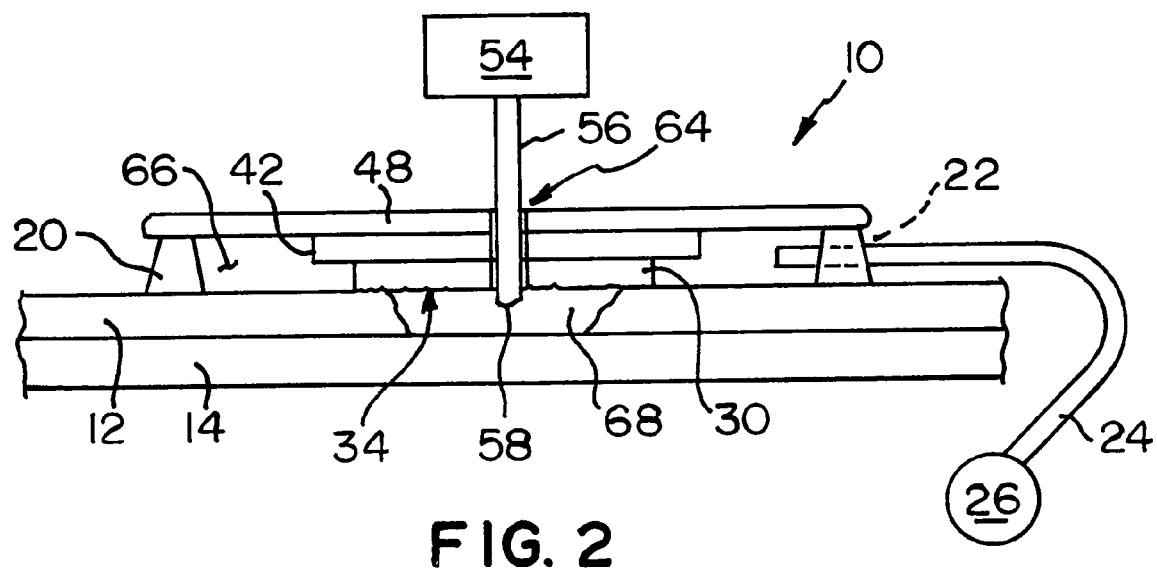
FIG. 2 is a side view (not to scale) of the repair assembly of FIG. 1 in an operational configuration.

FIGS. 1 and 2 illustrate a first exemplary repair assembly 10 and method of repair incorporating features of the invention. FIG. 1 illustrates a vehicle bed-liner 12 formed on a substrate 14, such as a metal vehicle substrate. The illustrated bed-liner 12 has a damaged area or "defect" 16 illustrated in the form of a hole. The defect 16 can extend through the bed-liner 12 to expose a portion of the underlying vehicle substrate 14. As will be appreciated by one of ordinary skill in the art, the vehicle substrate 14 can be coated with any conventional anti-corrosion coating or primer coating or similar coating conventionally utilized in the vehicle art. The defect 16 can extend to or into such a conventional coating or can extend all the way to the underlying metal substrate 14.

The individual components of the exemplary repair assembly 10 will first be described and then the use of these components to repair the defect 16 will be described.

The repair assembly 10 can include a vacuum support 20. The support 20 can be in the form of an upstanding wall that can be used to encircle the defect 16, as described below. The support 20 can be formed by a rigid, e.g., plastic or polymeric or metal, material or, in one particular embodiment, can be formed by a deformable clay or putty ring or bead that can be formed on the undamaged surface of the bed-liner 12 around the area of the defect 16. In another embodiment, the support 20 can be formed by conventional adhesive tape, such as duct tape. The support 20 can include a bore 22 or similar opening such that a vacuum conduit 24 can extend through the support 20 and into the interior of the area bounded by the support 20. The vacuum conduit 24 is connectable to a conventional vacuum source 26, such as a vacuum pump. The support 20 can be provided in a final form, such as a rigid plastic or metal member. Alternatively, material can be provided, such as conventional clay or putty, so that the support 20 can be constructed by a user of the repair assembly 10.

The repair assembly 10 includes a template 30 having a first (top) side 32 and a second (bottom) side 34. The bottom side 34 includes a design surface 36 having a selected design to be transferred to the patching material inserted into the defect 16, as described in more detail below. The template 30 can be a rigid, e.g., polymeric or metal, member or, in one particular embodiment, can be a flexible polymeric sheet or member that can be deformed to contact the top of the patching material injected into the defect 16. The template 30 can include a bore 38 or hole extending therethrough. The repair assembly 10 can include the template 30 in final form or can provide materials that can be utilized to form the template 30, as described below. The template 30 can be of any desired dimensions, e.g., length, width, or thickness. However, it is desirable that the template 30 be sufficiently large to at least cover the area of the defect 16.

The repair assembly can also include a backing plate 42. The backing plate 42 can be a rigid, e.g., plastic or metal, material that can press against or towards the template 30 to help force the template 30 against the patching material, as described in more detail below. Such a backing plate 42 is particularly useful if the template 30 is a flexible, e.g., deformable, material rather than a rigid member. A bore 44 or hole can extend through the backing plate 42. The backing plate 42 can be of any desired dimensions, e.g., length, width, or thickness. However, it is desirable that the backing plate 42 be sufficiently large to at least cover or overlay the template 30.

The repair assembly 10 can further include a vacuum sheet 48. The vacuum sheet 48 can be a flexible, e.g., polymeric, sheet that can be placed over the support 20 to help maintain a decreased pressure in the interior of the support 20 and to push the backing plate 42 against the template 30 to force the design surface 36 against the patching material, as will be described in more detail below. A bore 50 can extend through the vacuum sheet 48.

The repair assembly 10 can further include a conventional mixing device 54, such as a conventional cartridge or static mixing gun. A mixer conduit or tube 56 can be connected to the mixing device 54 and can be configured to extend through the bores 50, 44, 38 in the vacuum sheet 48, backing plate 42, and template 30 such that a discharge end 58 of the mixer tube 56 is placed in flow communication with the defect 16.

The repair assembly 10 can also include a multi-component patching material for use in patching the defect 16. The patching material can be a conventional two-component coating material, such as a urethane, polyurethane, or polyurea material. Conventional two-component polyurea systems typically include an isocyanate component maintained separately from an amine component. The two components can be rapidly mixed together using the mixing device 54 and then injected into the defect 16. Typically, the isocyanate component and amine component are 100% solids and, ideally, are mixed in a 1:1 volume ratio. The amine component often includes a mixture of primary and secondary amines that are combined in a weight ratio that is chosen to control the cure rate of the resultant patching composition. Primary amines react rapidly with an isocyanate component while secondary amines react more slowly. As such, the cure rate of a polyurea composition can be adjusted by controlling the ratio of primary and secondary amines in the amine component, as well as by controlling the mixing ratio of the amine and isocyanate components. The cure rate affects not only the rate at which the coating hardens but also the flowability of the coating and the resulting uniformity of the coating. Non-limiting examples of conventional polyurea coatings that can be utilized in the practice of the invention are disclosed in U.S. Pat. Nos. 6,013,755; 6,403,755; and 6,613,389. In the case where the bed-liner is formed utilizing one or more of the bed-liner coatings in U.S. Provisional Patent Application Ser. Nos. 60/606,662; 60/606,670; 60/606,638; 60/606,672; 60/606,661; or 60/606,639, the same material can be utilized as the patching material in the practice of the present invention. Suitable patching material is also commercially available from PPG Industries, Inc. under the tradename BDL or RBDL 1724.

In one particular practice of the invention, the patching material is a polyurea coating material formed using a process comprising the following steps: (a) selecting an isocyanate-functional composition and an amine-functional composition such that the ratio of equivalents of isocyanate groups to equivalents of amine groups is greater than 1 while the volume ratio of the isocyanate-functional composition to the amine-functional composition is 1:1; (b) mixing the isocyanate-functional composition and the amine-functional composition in a 1:1 volume ratio to produce a reaction mixture; and (c) applying the reaction mixture to a substrate, such as to a bed-liner defect 16, to form a polyurea coating (patching material).

A polyurea patching material prepared by the process in this embodiment of the present invention results in a material with acceptable tack-free time and a rapid, predictable cure time. By using excess isocyanate in the polyurea composition, adhesion to substrates is improved.

Such polyurea compositions may be prepared according to the process using a two-component mixing device. In a particular embodiment, the polyurea compositions can be prepared using a high-pressure impingement mixing device in which equal volumes of an isocyanate-functional component and an amine-functional component are impinged upon each other. The isocyanate-functional component and the amine-functional component react to produce a polyurea patching composition, which then cures to adhere to the substrate 14 and adjacent bed-liner 12 to patch the defect 16. High-pressure impingement mixing is particularly useful in preparing coatings from polymeric systems that have very fast reaction kinetics such as in the preparation of a polyurea. Polyurea coatings are typically formulated with a stream of an isocyanate-functional component herein referred to as an "A-side" and a stream of an amine-functional component herein referred to as a "B-side". The A-side containing the isocyanate-functional component can be a polyisocyanate monomer, a polyisocyanate prepolymer, or a blend of polyisocyanates. A prepolymer is an isocyanate which is pre-reacted with a sufficient amount of polyamine(s) or other isocyanate-reactive components (such as one or more polyols as are well known in the art) so that reactive sites on the polyisocyanate still remain in the prepolymer. Those remaining reactive sites on the polyisocyanate prepolymer are then available to react further with components in the B-side.

The present invention is described hereafter utilizing monomeric polyisocyanates, but this is not meant to be limiting. The present invention encompasses patching compositions comprising a polyisocyanate prepolymer, as described above, or a blend of polyisocyanates, e.g., a blend of one or more polyisocyanate prepolymers and/or one or more monomeric polyisocyanates. Suitable polyisocyanate reactants used on the A-side include isophorone diisocyanate (IPDI), which is 3,3,5-trimethyl-5-isocyanato-methyl-cyclohexyl isocyanate; hydrogenated materials such as cyclohexylene diisocyanate, 4,4'-methylenedicyclohexyl diisocyanate ($H_{12}$MDI); mixed aralkyl diisocyanates such as tetramethylxylyl diisocyanates, OCN—C(CH$_3$)$_2$—C$_6$H$_4$C(CH$_3$)$_2$-NCO; and polymethylene isocyanates such as 1,4-tetramethylene diisocyanate, 1,5-pentamethylene diisocyanate, 1,6-hexamethylene diisocyanate (HMDI), 1,7-heptamethylene diisocyanate, 2,2,4- and 2,4,4-trimethylhexamethylene diisocyanate, 1,10-decamethylene diisocyanate and 2-methyl-1,5-pentamethylene diisocyanate. Aliphatic isocyanates are particularly useful in producing polyurea patching materials and/or bed-liners which are exposed to UV light to avoid degradation. However, in other circumstances, less costly aromatic polyisocyanates may be used when durability is not of significant concern. Non-limiting examples of aromatic polyisocyanates include phenylene diisocyanate, toluene diisocyanate-(TDI), xylene diisocyanate, 1,5-naphthalene diisocyanate, chlorophenylene 2,4-diisocyanate, bitoluene diisocyanate, dianisidine diisocyanate, tolidine diisocyanate, and alkylated benzene diisocyanates generally; methylene-interrupted aromatic diisocyanates such as methylenediphenyl diisocyanate, especially the 4,4'-isomer (MDI) including alkylated analogs such as 3,3'-dimethyl-4,4'-diphenylmethane diisocyanate and polymeric methylenediphenyl diisocyanate.

An excess of polyisocyanate monomer can decrease the viscosity of the polyurea composition, allowing for improved flow. The cured bed-liner coatings which have previously been applied to automotive surfaces can comprise functional groups (e.g., hydroxyl groups) that are reactive to isocyanates, thereby enhancing adhesion of the sprayed polyurea patching composition to the first coating. A lower viscosity polyurea patching composition also keeps the composition in a flowable state for a longer period of time. In a particular embodiment of the present invention, at least 1 percent by weight, or at least 2 percent by weight, or at least 4 percent by weight of the isocyanate-functional composition comprises at least one polyisocyanate monomer.

It is to be understood that the use of various oligomeric polyisocyanates (e.g., dimers, trimers, polymeric, etc.) and modified polyisocyanates (e.g., carbodiimides, uretone-imines, etc.) is also within the scope of the invention. The A-side or the B-side also may include inert components, such as fillers, stabilizers and pigments.

Amines suitable for use in the B-side of the second coating composition of the present invention may be primary, secondary, tertiary amines, or mixtures thereof. The amines may be monoamines, diamines, triamines, or mixtures thereof. The amines also may be aromatic or aliphatic (e.g., cycloaliphatic). In one embodiment, the amine component comprises aliphatic amines to provide enhanced durability. The amine typically is provided as a liquid having a relatively low viscosity (e.g., less than about 100 mPa·s at 25° C.). In a particular embodiment, the amine component is based upon mixtures of primary and secondary amines. For example, if a mixture of primary and secondary amines is employed, the primary amine can be present in an amount of 20 to 80 percent by weight or 20 to 50 percent by weight, with the balance being secondary amines. Although others can be used, primary amines present in the composition generally have a molecular weight (Mn) greater than 200 (e.g., for reduced volatility), and secondary amines present generally comprise diamines with molecular weights (Mn) of at least 190 (e.g., 210-230).

In one particular embodiment, the amine-functional component includes at least one secondary amine present in an amount of 20 to 80 percent by weight or 50 to 80 percent by weight. Suitable secondary amines can include mono-functional acrylate or methacrylate modified aliphatic polyamines. Examples of suitable aliphatic polyamines include, without limitation, ethylamine, the isomeric propylamines, butylamines, pentylamines, hexylamines, cyclohexylamine, ethylene diamine, 1,2-diaminopropane, 1,4-diaminobutane, 1,3-diaminopentane, 1,6-diaminohexane, 2-methyl-1,5-pentane diamine, 2,5-diamino-2,5-dimethylhexane, 2,2,4- and/or 2,4,4-trimethyl-1,6-diamino-hexane, 1,11-diaminoundecane, 1,12-diaminododecane, 1,3- and/or 1,4-cyclohexane diamine, 1-amino-3,3,5-trimethyl-5-aminomethyl-cyclohexane, 2,4- and/or 2,6-hexahydrotoluylene diamine, 2,4'- and/or 4,4'-diamino-dicyclohexyl methane, and 3,3'-dialkyl4,4'-diamino-dicyclohexyl methanes (such as 3,3'-dimethyl-4,4'-diamino-dicyclohexyl methane and 3,3'-diethyl-4,4'-diamino-dicyclohexyl methane), 2,4- and/or 2,6-diaminotoluene, and 2,4'- and/or 4,4'-diaminodiphenyl methane, or mixtures thereof.

In an embodiment of the present invention, the secondary amine includes an aliphatic amine, such as a cycloaliphatic diamine. Such amines are available commercially from Huntsman Corporation (Houston, Tex.) under the designation of JEFFLINK™ such as JEFFLINK™ 754. In another embodiment, the amine can be provided as an amine-functional resin. Such amine-functional resin can be a relatively low viscosity, amine-functional resin suitable for use in the formulation of high solids polyurea coatings. While any of a number of different amine-functional resins may be suitable, in one embodiment of the invention, the amine-functional resin comprises an ester of an organic acid, for example, an aspartic ester-based amine-functional reactive resin that is compatible with isocyanates, e.g., one that is solvent-free, and/or has a mole ratio of amine-functionality to the ester of no more than 1:1 so there remains no excess primary amine upon reaction. One example of such polyaspartic esters is the derivative of diethyl maleate and 1,5-diamino-2-methylpentane, available commercially from Bayer Corporation of Pittsburgh, Pa. under the trade name Desmophen NH1220. Other suitable compounds containing aspartate groups may be employed as well. Additionally, the secondary polyamines can include polyaspartic esters which can include derivatives of compounds such as maleic acid, fumaric acid esters, aliphatic polyamines, and the like.

The amine-functional component also may include high molecular weight primary amines, such as polyoxyalkyleneamines. The polyoxyalkyleneamines contain two or more primary amino groups attached to a backbone derived, for example, from propylene oxide, ethylene oxide, or a mixture thereof. Examples of such amines include those available under the designation JEFFAMINE™ from Huntsman Corporation. Such amines typically have a molecular weight ranging from 200 to 7500, such as, without limitation, JEFFAMINE D-230, D-400, D-2000, T-403, and T-5000.

The volume ratio of the isocyanate-functional component to the amine-functional component in an impingement mixing device is typically 1:1. This 1:1 volume ratio is selected to ensure proper mixing within a standard impingement mixing device. One example of a commercially available mixing device accepted for use in the automotive industry is a GUSMER™ VR-H-3000 proportioner fitted with a GUSMER™ Model GX-7 spray gun. In that device, pressurized streams of components of the A-side and the B-side are delivered from two separate chambers of a proportioner and are impacted or impinged upon each other at high velocity to effectuate an intimate mixing of the two components to form a polyurea composition, which can be coated onto the desired substrate via the spray gun. During mixing, the components are atomized and impinged on each other at high pressure. Superior control of the polyurea reaction is achieved when the forces of the component streams are balanced. The mixing forces experienced by the component streams are determined by the volume of each stream entering the mixing chamber per unit time and the pressure at which the component streams are delivered. A 1:1 volume ratio of the components per unit time serves to equalize those forces. A 1:1 volume ratio of isocyanate to amine can be particularly critical for the automotive OEM application of sprayable polyurea truck bed-liners. The two-component mixing devices accepted for use by automotive manufacturers are limited to standard impingement mixing devices which operate most effectively when the component streams are of equal volume. Attempts to produce polyurea truck bed-liners at other volume ratios, such as at 1:1.3, have been unsuccessful.

The ratio of equivalents of isocyanate groups to amine groups may be selected to control the rate of cure of the polyurea coating composition, thereby affecting adhesion. It has been found that two-component polyurea compositions capable of being produced in a 1:1 volume ratio have advantages, particularly in curing and adhesion, when the ratio of the equivalents of isocyanate groups to amine groups (also known as the reaction index) is greater than 1, such as 1.03 to 1.10, often 1.05 to 1.08. Being "capable of being produced in a 1:1 volume ratio" means that the volume ratio varies by up to 20% for each component, or up to 10% or up to 5%. The isocyanate-functional component and the amine-functional component can be selected from any of the isocyanates (including polyisocyanates) and amines listed above to provide a reaction index that is greater than 1, while being capable of being applied in a 1:1 volume ratio and acceptable performance of the resulting coating.

In some instances, a desired physical property of a polyurea coating composition for a truck bed-liner or bed-liner patching material is surface texture. Surface texture can be created by first spraying or applying the polyurea composition onto the substrate 14 to produce a smooth, substantially tack-free first layer. By "substantially tack-free" is meant the condition wherein upon gently touching the surface of the layer with a loose fitting glove, the glove tip does not stick, or otherwise adhere, to the surface as determined by the Tack-Free Method. The Tack-Free Method provides that the coating composition be sprayed in one coat onto a non-adhering plastic sheet to a thickness of 10 to 15 mil (254-381 microns). When spraying is complete, an operator, using a loose fitting, disposable vinyl glove, such as one commercially available under the trade name Ambidex Disposable Vinyl Glove by Marigold Industrial, Norcross, Ga., gently touches the surface of the coating. The coating may be touched more than one time by using a different fingertip. When the glove tip no longer sticks to, or must be pulled from, the surface of the layer, the layer is said to be substantially tack-free. A time beginning from the completion of spraying until when the coating is substantially tack-free is said to be the tack-free time.

The tack-free time and the cure time for the polyurea composition may be controlled by balancing the ratio of primary amines to secondary amines. A second or subsequent layer of the polyurea composition then can be applied to the first layer as a texturizing layer or "dust coating". This may be accomplished, for example, by increasing the distance between the impingement mixing device and the coated substrate to form discrete droplets of the polyurea composition prior to contacting the coated substrate, thereby forming controlled non-uniformity in the surface of the second layer. The substantially tack-free first layer of the polyurea coating is at least partially resistant to the second polyurea layer, i.e., at least partially resistant to coalescence of the droplets of polyurea composition sprayed thereon as the second polyurea layer or dust coating, such that the droplets adhere to but do not coalesce with the first layer to create surface texture. Typically, the second polyurea layer exhibits more surface texture than the first polyurea layer. An overall thickness of the two polyurea layers may range from 60 to 100 mil (1524-2540 microns), with the first layer being one half to three quarters of the total thickness (762-1905 microns) and the dust coating being one fourth to one half of the total thickness (381-1270 microns).

Note further that each layer of the polyurea coating may be deposited from different compositions. In one embodiment, the first layer is deposited from a polyurea composition comprising an aromatic amine component and an aromatic polyisocyanate component, while the second layer is deposited from a polyurea composition comprising an aliphatic amine component and an aliphatic polyisocyanate component. It should be noted that the "first" polyurea coating layer may comprise one, two, three or more layers, and the "second" polyurea coating layer may be one or more subsequent layers applied thereover. For example, in one embodiment of the present invention, four polyurea layers may be applied, with the fourth layer being the dust coating, with each layer having a thickness ranging from 15 to 25 mil (381-635 microns).

The polyurea composition may also include one or more additives, for example, a light stabilizer, thickener, pigment, fire retardant, catalyst, or other performance or property modifiers. Such additives are typically provided in the A-side but may instead be provided in the B-side or in both.

In a particular embodiment of the present invention, the amine-functional component (B-side) further comprises a clay and optionally a silica. In this embodiment, a coating layer formed from the two-component polyurea coating composition over a surface of a metal substrate has been found to have better adhesion to the metal substrate than a similar coating composition without a clay or a silica.

The clay may be selected from montmorillonite clays, such as bentonite, kaolin clays, attapulgite clays, sepiolite clay, and mixtures thereof. Additionally, the clay may be surface treated as is known in the art. Any suitable surface treatment may be used, for example, one or more amines according to the following structures:

$R^1$—N $R^2R^3$

$R^1$—N$^+R^2R^3$ $R^7$

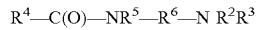

$R^4$—C(O)—NR$^5$—R$^6$—N $R^2R^3$

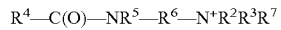

$R^4$—C(O)—NR$^5$—R$^6$—N$^+R^2R^3R^7$ wherein $R^1$ and $R^4$ are independently $C_4$-$C_{24}$ linear, branched, or cyclic alkyl, aryl, alkenyl, aralkyl or aralkyl, $R^2$, $R^3$, $R^5$, and $R^7$ are independently H or $C_1$-$C_{20}$ linear, branched, or cyclic alkyl, aryl, alkenyl, aralkyl or aralkyl, and $R^6$ is $C_1$-$C_{24}$ linear, branched, or cyclic alkylene, arylene, alkenylene, aralkylene or aralkylene. As a non-limiting example, surface treated bentonite may be used, such as the alkyl ammonium bentonites described in U.S. Pat. No. 3,974,125.

In an embodiment of the invention, the clay is present in the polyurea composition at a level of at least 0.5 percent by weight, in some cases at least 1 percent by weight, and in other cases at least 1.5 percent by weight. When the amount of clay is too low, the composition can have poor rheological properties as well as less than desirable adhesion properties. Also, the clay can be present at up to 6 percent by weight, in some cases up to 5 percent by weight, and in other cases up to 4 percent by weight of the composition. When the amount of clay is too high, the viscosity of the composition can be too high to handle effectively. The amount of clay in the two-component polyurea composition can be any value or range between any values recited above.

As mentioned above, the two-component polyurea composition can optionally include a silica. Any suitable silica can be used, so long as it is a suitable thixotrope. In a particular embodiment of the invention, the silica is fumed silica.

When present, the silica is present in the two-component coating composition at a level of at least 0.5 percent by weight, in some cases at least 1 percent by weight, and in other cases at least 1.5 percent by weight. When the amount of silica is too low, the composition can have poor rheological properties as well as less than desirable adhesion properties. Also, the silica can be present at up to 6 percent by weight, in some cases up to 5 percent by weight, and in other cases up to 4 percent by weight of the composition. When the amount of silica is too high, the viscosity of the composition can be too high to handle effectively. The amount of silica in the two-component coating composition can be any value or range between any values recited above.

One embodiment of the present invention includes the use of an adhesion promoter for enhancing adhesion of the polyurea patching composition to the substrate 14. In an embodiment of the present invention, the substrate 14 may comprise bare metal (including an anodized metal), pre-treated metal, or, as noted above, there may be a pre-applied (first) coating over which the polyurea composition is applied as part of a multi-component composite coating, selected from electrodepositable film-forming compositions, primer compositions, pigmented monocoat compositions, pigmented base coat compositions, transparent topcoat compositions, industrial coating compositions, and other coatings commonly used in the original equipment manufacture of automobiles or in automotive refinish. When the polyurea patching coating is applied over a first coating, the multi-component composite coating of the present invention further comprises an adhesion promoting composition, the adhesion promoting composition being included in at least one of the first and second coating compositions, and/or applied as a separate layer over at least a portion of the first coating layer prior to application of the second coating composition. In this embodiment, the second polymeric layer has a 90° peel adhesion resistance of at least 5 ft-lbs., often at least 10 ft-lbs., more often at least 15 ft-lbs. as determined according to the test method outlined in ASTM D 1876, without use of a fixturing device.

The adhesion promoter may be provided with the polyurea components in the A-side or B-side. Alternatively, the adhesion promoter may be applied as a separate layer directly to the substrate or first coating prior to application of the polyurea coating thereto. When applied as a separate layer, the adhesion promoter may be dispersed or dissolved in a carrier, such as an organic solvent or water, which is evaporated prior to application of the polyurea coating. Alternatively, the adhesion promoter may be in a form which allows for direct application to the substrate. The adhesion promoter may also be a component of the first coating composition. In any case, it may be applied by wiping, dipping, roll coating, curtain coating, spraying, or other application techniques as are well known in the art.

Examples of suitable adhesion promoters include amines (such as tertiary amines or melamines), amino silanes, metal complexes, and urethane acrylate compositions. The underlying mechanism which enhances adhesion of the polyurea coating to the substrate by the adhesion promoter may involve one or more phenomenon, such as but not limited to catalysis of a reaction between reactive groups of the substrate (e.g., hydroxyl groups) and functional groups of the polyurea composition, reaction with the substrate or bonding with the substrate, such as via hydrogen bonding.

Suitable tertiary amines for use as adhesion promoters include 1,5-diazabicyclo[4.3.0]non-5-ene, 1,8-diazabicyclo [5.4.0]undec-7-ene, 1,4-diazabicyclo[2.2.2]octane, 1,5,7-triazabicyclo[4.4.0]dec-5-ene, and 7-methyl-1,5,7-triazabicyclo[4.4.0]dec-5-ene. An example of an amino silane for use as an adhesion promoter is γ-aminopropyltriethoxysilane (commercially available as Silquest A100 from OSY Specialties, Inc.). Other suitable amine-functional adhesion promoters include 1,3,4,6,7,8-hexahydro-2H-pyrimido-(1,2-A)-pyrimidine, hydroxyethyl piperazine, N-aminoethyl piperizine, dimethylamine ethylether, tetramethyliminopropoylamine (commercially available as Polycat® 15 from Air Products and Chemicals, Inc.), blocked amines such as an adduct of IPDI and dimethylamine, a melamine such as melamine itself or an imino melamine resin (e.g. Cymel® 220 or Cymel® 330, available from Cytec Industries Inc.). Metal-containing adhesion promoters may include metal chelate complexes, such as an aluminum chelate complex (e.g. K-Kat 5218 available from King Industries), or tin-containing compositions, such as stannous octoate. Other adhesion promoters may include salts such as chlorine phosphate, butadiene resins such as an epoxidized, hydroxyl terminated polybutadiene resin (e.g., Poly bd® 605E available from Atofina Chemicals, Inc.), polyester polyols (e.g., CAPA® 3091, a polyester triol available from Solvay America, Inc.), and urethane acrylate compositions such as an aromatic urethane acrylate oligomer (e.g., CN999 available from Sartomer Company, Inc.).

A particular embodiment of the present invention provides a coated substrate, vehicle, or vehicle substrate comprising a substrate, typically a truck bed, which can be coated with a first coating composition and at least one layer of at least one sprayable polyurea bed-liner composition, or any of the multi-component composite coatings as disclosed above, deposited over at least a portion of the coated substrate. The bed-liner can include one or more patched or repaired areas formed in accordance with the invention. In this embodiment, the first coating composition on the substrate and at least one layer of the polyurea bed-liner coating composition and the patching material can comprise one or more color pigments such that at least a portion of the coated vehicle substrate has a color that substantially corresponds to the color of an associated vehicle body, with the color of the patching material substantially corresponding to the color of the bed-liner. The color pigments may be present in either or both of the first polyurea layer and the second, texturizing polyurea layer as part of the polyurea coating. In this embodiment, the color of the second substrate, typically a truck bed coated with at least one polyurea coating composition, substantially the same as the color of the vehicle body. And, the color of the patching material matches the color of the polyurea bed-liner.

Pigments may be metallic pigments or organic or inorganic color pigments. Suitable metallic pigments include, in particular, aluminum flake, copper bronze flake, and metal oxide coated mica. Besides the metallic pigments, the coating compositions may contain non-metallic color pigments including inorganic pigments, such as titanium dioxide, iron oxide, chromium oxide, lead chromate, and carbon black, and organic pigments such as phthalocyanine blue and phthalocyanine green. In general, the pigment is incorporated into each coating composition in amounts of about 1 to 80 percent by weight based on the total weight of coating solids. The metallic pigment is employed in amounts of about 0.5 to 25 percent by weight based on the total weight of coating solids.

Figure 3:
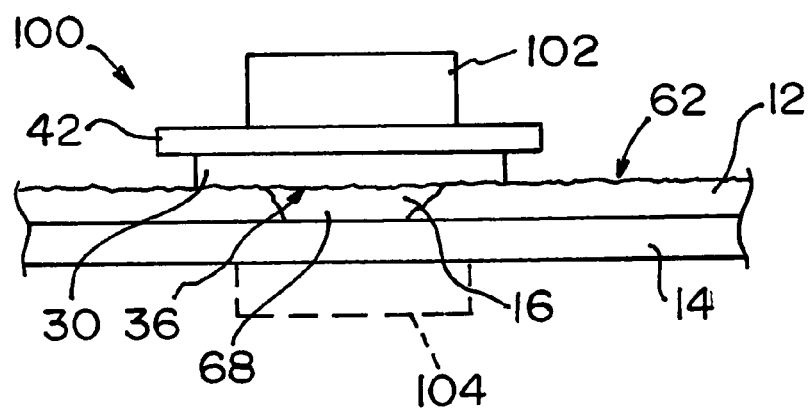
FIG. 3 is a side view (not to scale) of another repair assembly of the invention.

A second exemplary repair assembly 100 is illustrated in FIG. 3. This repair assembly includes a template 30 and a backing plate 42 as described above but, in this embodiment, the template 30 and backing plate 42 do not have the bores therethrough as described in the first repair assembly 10. The repair assembly 100 further includes a magnet 102 that can be used to bias the backing plate 42 and template 30 towards the substrate 14 during the patching process as described below. One exemplary non-limiting embodiment of a magnet 102 suitable for the invention is a neodinium-iron-boron magnet commercially available from Force Field Company of Colorado. Other suitable magnets are commercially available from Granger Inc. and can be, for example, a conventional 50-pound Granger magnet. A weight, such as a three to five pound weight, can be used in place of a magnet on horizontal or substantially horizontal surfaces.

The repair assembly 100 can further include a heater 104, such as a conventional electromagnetic induction heater. The heater 104 can be used to assist in removing damaged bed-liner as described in more detail below. A suitable induction heater is an Inductor DLX induction heater commercially available from Induction Industries, Inc. of Sleepy Hollow, Ill.

One or more of the above-described components of the repair assemblies 10 or 100 can be provided in the form of a kit to permit patching or repair of damaged bed-liners.

Use of the exemplary repair assembly 10 described above will first be discussed with respect to repairing a defect 16 in a spray-applied vehicle bed-liner 12 and then use of the repair assembly 100 will be discussed.

If there is a defect 16, such as a rupture, break, tear, bubble, or hole in the bed-liner 12, the defective area of the bed-liner material can be prepared for patching by removing loose or damaged bed-liner material from the underlying surface of the metal substrate 14. This can be done, for example, by gently heating the underlying metal surface, or the bed-liner 12 itself, to a temperature in the range of 100° F. to 200° F. (37.4° C. to 92.4° C.), such as 120° F. to 180° F. (48.4° C. to 81.420 C.), such as 150° F. to 170° F. (64.9° C. to 75.9° C.), such as 160° F. (70.4° C.) An induction heater (such as an induction heater 104) can be used to heat the underlying metal surface, or a heat gun can be used to heat the bed-liner 12 itself. If the latter method is used, care should be taken not to overheat the bed-liner 12 to destroy or melt the bed-liner material. A chisel, gouge, razor knife, or conventional cutting tool or other suitable instrument can be used to remove the defective, loose or damaged bed-liner portion. An example of one suitable tool is a conventional electric cutting tool commercially available from the Robert Bosch Tool Corporation under the tradename Dremel. The bed-liner material can thermally debond from the underlying metal surface at the heating temperatures mentioned above. After the defective portion of the bed-liner 12 is removed, the edges of the defect cavity can be feathered and/or smoothed with a dye grinder and/or conventional sand paper to smooth out the surface and ensure that no sharp edges protrude above the normal surface level of the bed-liner 12.

If the defect cavity extends to the metal, a phosphate treatment can be applied to the metal before patching to help prevent corrosion. One suitable phosphate treatment is commercially available from PPG Industries, Inc. under the tradename Chemphos Phosphate Treatment.

If the surface of the patched area is desired to have a particular pattern or texture, such as a pattern to match a pattern 62 in the adjacent bed-liner 12, e.g., the bed-liner adjacent to the defect, a polymeric template 30 can be prepared by pouring and spreading a conventional two-component room-temperature vulcanizing (RTV) resin material onto the adjacent non-defect bed-liner surface to capture the texture and/or pattern 62 of the bed-liner 12 surface. Conventional RTV resins, such as silicone, usually cure in about 16 to 24 hours and can then be removed from the bed-liner surface, such as by lifting or pulling the cured resin patch (template 30) off of the bed-liner surface. Alternatively, a flexible template 30 can be prepared in similar manner by using conventional dental impression material, such as but not limited to those described in U.S. Pat. Nos. 6,649,146 and 6,762,242. The resultant template 30 thus has an upper, smooth side 32 and a lower side 34 with a design surface 36. It is to be understood that the design surface 36 could alternatively be a flat surface. In this embodiment, the resultant polymeric template 30 can be flexible or bendable and can have a thickness in the range of greater than 0 inch to 1 inch (greater than 0 cm to 2.5 cm), such as 0.125 inch (0.32 cm). It is desirable if the surface area of the design surface 36 is larger than the defect area to be repaired. For example, in one embodiment, the template 30 can extend in the range of 0.5 inch to 2 inches (1.75 cm to 5 cm), such as 1 inch (2.5 cm) beyond the edges of the defect area to be repaired.

If desired, the support 20 can be placed on the bed-liner 12 surface around the defect 16. In one embodiment, the support 20 can be formed by one or more layers of conventional duct tape. If the geometry of the bed-liner 12 warrants, the support 20 can also be formed by other means, such as by a plastic or metal ring or by a dam formed by modeling clay or putty. This clay dam can be used instead of the duct tape or can be formed on top of the duct tape.

The template 30 is placed over the defect 16, with the design surface 36 facing downwardly. The backing plate 42 is placed on top of the template 30. It is desirable if the edges of the backing plate 42 extend beyond the edges of the template 30. The vacuum sheet 48 can be placed on top of the backing plate 42, with the edges of the vacuum sheet 48 extending to or beyond the upper edge of the support 20. The bores 38, 44, 50 in the template 30, backing plate 42, and vacuum sheet 48 should be aligned to form a passage 64 through these members to the defect 16 cavity.

The mixer tube 56 can be inserted through the aligned bores 50, 44, 38 in the vacuum sheet 48, backing plate 42, and template 30 into or above the defect 16 cavity to be patched. The vacuum pump 26 can be turned on to form at least a partial vacuum inside a chamber 66 defined by the support 20, the surface of the bed-liner 12, and bottom of the vacuum sheet 48. In one embodiment, the vacuum pump 26 is configured to provide a vacuum of about 25 inches of Hg in the chamber 66.

The patching material is injected through the mixer tube 56 into the defect 16 cavity. As will be appreciated from FIG. 2, the vacuum in the chamber 66 causes the flexible vacuum sheet 48 to deform or press downwardly against the backing plate 42 which, in turn, presses downwardly onto the template 30 to press the design surface 36 into the top of the patching material injected into the defect 16 cavity. The patching composition cures to fill the defect 16 and form a patch 68 in the bed-liner 12. An upper surface 70 of the patch 68 includes the design corresponding to the design surface 36.

When the patching material cures, typically in about 2 to 5 minutes, to form the patch 68, the vacuum pump 26 can be turned off and the vacuum sheet 48, backing plate 42, and template 30 removed. The support 20, if present, is also removed from the bed-liner 12 surface. The above method can be used in both horizontal and vertical surfaces. Injecting the patching material composition through the mixer tube 56 can result in a small nub where the tube 56 was positioned after the patching material has cured. This nub can be cut away or sanded down if desired. The repair assembly 10 and method can be reused numerous times for subsequent similar repairs of the bed-liner 12.

Another exemplary method incorporating features of the invention utilizing the second repair assembly 100 will now be described. The area to be repaired can be generally prepared as described above. For example, the defective area can be heated, such as by an induction heater 104, to loosen the bed-liner material in the area of the defect. A tool, such as a utility knife or cutting tool as described above, can then be used to remove the defective or damaged bed-liner material. If the defect 16 extends to the surface of the underlying metal substrate 14, a conventional phosphate or similar anticorrosive treatment and/or primer can be applied to the metal before patching to help prevent corrosion.

For relatively small defects 16, such as less than about 1 inch (2.54 cm) in diameter, the patching material can be deposited into the defect cavity. Suitable patching material is commercially available from PPG Industries, Inc. under the tradenames BDL and RBDL 1724. As described above, conventional patching material is typically provided as a two-component system having an isocyanate component maintained separately from an amine component. These two components can be mixed prior to injecting or depositing the patching material into the defect 16. In one embodiment, the two components can be mixed using a conventional mixing gun having 20 or more mixer elements.

The template 30 can be prepared as described above. In one embodiment, the template 30 can be prepared by applying a vinyl polysiloxane material onto the surface of the bed-liner 12 and then cured to impart a desired pattern onto the bottom of the template 30. The template 30 can be pressed against the patching material in the defect 16. One suitable vinyl polysiloxane material is commercially available from Cammda Corporation. While forming the template 30, the backing plate 42 can be placed on top of the vinyl polysiloxane material to help press the material against the bed-liner 12 while the material cures. Typically, a template 30 having a thickness in the range of ⅛ to ¼ inch (0.318 cm to 0.635 cm) is sufficient.

The template 30 is placed over the patching material and the backing plate 42 is placed over the template 30. In the repair assembly 100, the magnet 102 can be placed on top of the backing plate 42 to bias the backing plate 42 and template 30 toward the patching material, i.e., toward the underlying metal substrate 14. The use of the magnet 102 allows the repair assembly 100 to be practiced on horizontal, vertical, or even overhead surfaces. The magnet 102 can be left in place until the patching material cures. At which time, the template 30, backing plate 42, and magnet 102 can be removed.

For larger defects 16, such as defects of greater than 1 inch (2.54 cm) in diameter, after the defective area has been prepared by heating, cutting, and/or phosphate treatment, the area can be masked using wire tape. After which, the defect cavity can be at least partially filled with a conventional filler material, such as a two-component epoxy filler. Conventional epoxy fillers usually take the form of epoxy mercaptan or epoxy urethane materials. One suitable epoxy filler is commercially available from PPG Industries, Inc. under the tradename SX 1052. The filler material can be cured and then sanded to about the level of the original bed-liner surface. The patching material can then be sprayed from a conventional spray gun to apply the patching material over the filler material. The template 30, backing plate 42, and magnet 102 can then be used as described above to repair the defect 16. After which time, the masking tape can be removed.

It is to be understood that the invention is not limited to the specific exemplary embodiment described above. For example, in some instances it may be desirable to fill the defect 16 cavity with the patching material, place the template 30 over the patching material, and then manually pressing the backing plate 42 against the template 30 until the patching material has cured to form the patch 68. In another example, rather than having a separate flexible template 30 and rigid backing plate 42, the template 30 itself can be formed by rigid, e.g., plastic, material so that the patching material can be deposited into the defect 16 cavity and then the rigid template 30 can be pressed, such as manually, against the patching material until the patching material cures to form the patch 68.

The following examples are intended to illustrate particularly useful patching materials of the invention but should not be construed as limiting the invention in any way.

EXAMPLES

A polyurea patching composition was produced from the formulation of Example 1 in Table 1 by mixing a 1:1 volume ratio of the A-side components to the B-side components in a high-pressure impingement mixing device manufactured by Gusmer Corporation.

The A-side components were premixed and charged into one holding chamber of the mixing device. The B-side was prepared by preparing a prepolymer by mixing the IPDI, terathane, butanediol, and neopentyl glycol under nitrogen. A catalytic amount of dibutyl tin dilaurate (DBTL) was added and the mixture was stirred for 15 minutes. The reaction mixture was first heated to 40° C. and then to 100° C. The resulting prepolymer was cooled to 80° C. and poured into 95% of the Desmodur N3400 and stirred for 15 minutes. Additional Desmodur N3400 was added to adjust the isocyanate equivalent weight.

The ratio of equivalents of isocyanate to amine was calculated as being 1.04.

Another polyurea composition was produced from the formulation of Example 2 in Table 1. The ratio of equivalents of isocyanate to amine was calculated as being 1.08.

TABLE 1

| | percent by weight | |
|---|---|---|
| | Example 1 | Example 2 |
| A-side Component | | |
| IPDI (diisocyanate) | 26.8 | 26.8 |
| Desmodur N3400 (diisocyanate) | 50.0 | 50.0 |
| Terathane 650 | 20.8 | 20.8 |
| 1,2-butanediol | 1.2 | 1.2 |
| Neopentyl glycol | 1.2 | 1.2 |
| B-side Component | | |
| Jeffamine T-3000 (polyoxyalkylene primary amine) | 30.8 | 33.8 |
| Desmophen NH 1220 (amine-functional aspartic acid ester) | 29.5 | 29.8 |
| Jefflink 754 (alicyclic secondary amine) | 34.4 | 31.1 |
| Irganox 1135 (hindered phenolic antioxidant) | 0.02 | 0.02 |
| Tinuvin 328 (benzotriole UV absorber) | 0.02 | 0.02 |
| Molecular sieve Type 3A (Potassium/sodium aluminate) | 0.5 | 0.5 |
| Aerosil 200/Cab-O-Sil M-5 (silicon dioxide) | 3.0 | 1.75 |
| Aerosil R972 (silicon dioxide) | 0.5 | — |
| Z-6020 Silane (amino silane) | 0.02 | 0.02 |
| Vulcan XC-72R (carbon black powder) | 1.2 | 1.2 |
| Bentone (bentonite clay) | — | 1.74 |

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A method of repairing a protective coating, comprising: depositing a multi-component patching material into a coating defect; contacting the patching material with a template having a design surface such that the design on the design surface is transferred to the patching material; and forming a vacuum to press the design surface against the patching material.

2. The method of claim 1, including depositing a filler material in the coating defect before depositing the patching material.

3. The method of claim 1, wherein the multi-component patching material comprises urethane, polyurethane, and/or polyurea.

4. The method of claim 1, wherein the patching material comprises a two-component patching material.

5. The method of claim 1, wherein the patching material is a polyurea composition comprising an isocyanate-functional composition and an amine-functional composition, with the ratio of equivalents of isocyanate groups to equivalents of amine groups being greater than 1, with the volume ratio of the isocyanate-functional composition to the amine-functional composition being capable of application to a coating defect in a 1:1 ratio.

6. The method of claim 5, wherein the isocyanate-functional component is selected from isophorone diisocyanate, cyclohexylene diisocyanate, 4,4'-methylenedicyclohexyl diisocyanate, tetramethylxylyl diisocyanates, 1,4-tetramethylene diisocyanate, 1,5-pentamethylene diisocyanate, 1,6-hexamethylene diisocyanate, 1,7-heptamethylene diisocyanate, 2,2,4- and 2,4,4-trimethylhexamethylene diisocyanate, 1,10-decamethylene diisocyanate, 2-methyl-1,5-pentamethylene diisocyanate, phenylene diisocyanate, toluene diisocyanate, xylene diisocyanate, 1,5-naphthalene diisocyanate, chlorophenylene 2,4-diisocyanate, bitoluene diisocyanate, dianisidine diisocyanate, tolidine diisocyanate, methylenediphenyl diisocyanate, 3,3'-dimethyl-4,4'-diphenylmethane diisocyanate, polymeric methylenediphenyl diisocyanate, and mixtures thereof.

7. The method of claim 6, wherein the isocyanate-functional component comprises isophorone diisocyanate.

8. The method of claim 5, wherein the amine-functional component is selected from monoamines, diamines, triamines, and mixtures thereof.

9. The method of claim 5, wherein the amine-functional composition comprises a primary amine and a secondary amine.

10. The method of claim 9, wherein the amine-functional composition comprises 20-80 percent by weight primary amine and the balance secondary amine.

11. The method of claim 1, wherein the template is flexible and the method includes contacting the flexible template with a rigid backing plate to press the design surface against the patching material.

12. A method of repairing a protective coating, comprising:

depositing a multi-component patching material into a coating defect; contacting the patching material with a template having a design surface such that the design on the design surface is transferred to the patching material;

providing a support on the coating surface surrounding the defect;

providing a vacuum sheet over the defect, the vacuum sheet extending beyond a circumference of the support; and placing a vacuum pump in flow communication with a chamber formed by the coating surface, support, and vacuum sheet such that when a vacuum is formed in the chamber, the vacuum sheet presses downwardly to force the template against the patching material.

13. A method of repairing a vehicle bed-liner, comprising:

depositing a two-component patching material into a bed-liner defect;

placing a template having a design surface over the bed-liner defect, with the design surface facing the defect;

placing a rigid backing plate over the template;

biasing the template toward the patching material; and curing the patching material to patch the defect.

14. The method of claim 13, wherein the biasing step is practiced by using a magnet to bias the template toward the patching material.

15. The method of claim 13, wherein the biasing step is practiced by using a vacuum to bias the template toward the patching material.

* * * * *